United States Patent
Lauer et al.

(10) Patent No.: US 7,138,438 B2
(45) Date of Patent: Nov. 21, 2006

(54) POLYMERIC NANOPARTICLE FORMULATIONS AND THEIR USE FOR IMPROVING THE DIRT PICK UP RESISTANCE OF A COATING

(75) Inventors: Rosemarie Palmer Lauer, Chalfont, PA (US); Ralph Craig Even, Blue Bell, PA (US); Donna Staley Grecian, Quakertown, PA (US); Robert David Solomon, Souderton, PA (US)

(73) Assignee: Rohm and Haas Company, Philadelphia, PA (US)

( * ) Notice: Subject to any disclaimer, the term of this patent is extended or adjusted under 35 U.S.C. 154(b) by 278 days.

(21) Appl. No.: 10/461,963

(22) Filed: Jun. 13, 2003

(65) Prior Publication Data
US 2006/0217453 A1 Sep. 28, 2006

Related U.S. Application Data

(60) Provisional application No. 60/414,592, filed on Sep. 30, 2002.

(51) Int. Cl.
*C08L 27/12* (2006.01)
*C08L 43/04* (2006.01)
*C08F 220/22* (2006.01)
*C08F 220/10* (2006.01)
*G03C 1/73* (2006.01)

(52) U.S. Cl. .............................. 522/35; 522/86; 522/85; 524/805; 524/806; 524/818

(58) Field of Classification Search .................. 522/35, 522/86, 85; 524/805, 806, 818
See application file for complete search history.

(56) References Cited

U.S. PATENT DOCUMENTS

| | | | |
|---|---|---|---|
| 4,487,855 A | 12/1984 | Shih et al. | |
| 4,514,552 A | 4/1985 | Shay et al. | |
| 4,560,714 A | 12/1985 | Gajria et al. | |
| 4,746,455 A | 5/1988 | Matsuda et al. | |
| 4,777,213 A * | 10/1988 | Kanda et al. | 525/114 |
| 5,162,415 A * | 11/1992 | Rehmer et al. | 524/359 |
| 5,212,273 A * | 5/1993 | Das et al. | 526/323.1 |
| 5,248,805 A * | 9/1993 | Boettcher et al. | 558/270 |
| 5,290,654 A | 3/1994 | Sacripante et al. | |
| 5,340,865 A * | 8/1994 | Neff et al. | 524/317 |
| 5,439,970 A * | 8/1995 | Reeb | 524/558 |
| 5,538,717 A | 7/1996 | La Poterie | |
| 5,863,996 A | 1/1999 | Graham | |
| 5,874,111 A | 2/1999 | Maitra et al. | |
| 6,020,419 A | 2/2000 | Bock et al. | |
| 6,048,667 A * | 4/2000 | Eldin et al. | 430/281.1 |
| 6,194,530 B1 | 2/2001 | Klesse et al. | |
| 6,268,222 B1 | 7/2001 | Chandler et al. | |
| 6,329,446 B1 | 12/2001 | Sacripante et al. | |
| 6,387,519 B1 | 5/2002 | Anderson et al. | |
| 2002/0065208 A1 | 5/2002 | Aubay et al. | |
| 2002/0164297 A1 | 11/2002 | Ferrari et al. | |
| 2002/0177522 A1 | 11/2002 | Alexander, IV et al. | |
| 2002/0193521 A1 | 12/2002 | Cruz et al. | |
| 2003/0055178 A1 | 3/2003 | Gore et al. | |
| 2003/0059599 A1 | 3/2003 | Beckley et al. | |
| 2003/0162890 A1 | 8/2003 | Kalantar et al. | |
| 2005/0171265 A1* | 8/2005 | Bortnick et al. | 524/445 |

FOREIGN PATENT DOCUMENTS

| | | |
|---|---|---|
| EP | 1008635 B1 | 6/2000 |
| EP | 1245587 A1 | 10/2002 |
| WO | WO 93/00376 | 1/1993 |
| WO | WO 93/24534 | 12/1993 |
| WO | WO 99/01522 | 1/1999 |
| WO | WO 00/59951 | 10/2000 |
| WO | WO 01/43859 | 6/2001 |
| WO | WO 01/90226 | 11/2001 |

* cited by examiner

*Primary Examiner*—Susan Berman
(74) *Attorney, Agent, or Firm*—Kim R. Jessum

(57) ABSTRACT

A formulation for repelling particulate matter on the surface of a coating comprising polymeric nanoparticles having a mean particle diameter of from 1 to 50 nm. The polymeric nanoparticles may further be functionalized to impart additional characteristics to modify the surface of the dried coating to minimize the chances for particles to become embedded or attached to the coating.

19 Claims, No Drawings

POLYMERIC NANOPARTICLE FORMULATIONS AND THEIR USE FOR IMPROVING THE DIRT PICK UP RESISTANCE OF A COATING

CROSS REFERENCE TO RELATED PATENT APPLICATIONS

This is a non-provisional application of prior pending U.S. provisional application Ser. No. 60/414,592 filed Sep. 30, 2002.

The present invention relates to a coating and specifically to a polymeric composition which improves the ability of the coating to resist contaimination by dirt, dust, pollution, and other types of particulate matter. The present composition provides a means to modify the coating in such a way as to minimize the chances for particles to become permanently embedded or attached to the coating thus improving its dirt "pick up" resistance characteristics.

In those applications where polymeric coatings are applied to a substrate coating thus improving its dirt "pick up" resistance characteristics. damage, or provide other specific performance functions, it is desirable that the coating remain clean and free of dirt, soil or other contaminants throughout the useful service life of the coating. The loss of either the aesthetic or functional qualities of a decorative or protective coating due to soiling creates a need for premature or frequent maintenance or replacement. For example, dirt pick-up of exterior house coatings leads to an unsatisfactory dingy appearance. Dirt pick-up compromises the solar reflectance capability of today's newer energy-saving elastomeric roof coatings. In traffic paint applications, loss of whiteness results in loss of daytime visibility.

From the moment it is applied, a coating is exposed to contamination from the atmosphere. This contamination is comprised of dirt and dust which are carried to the coating surface by rain, airborne moisture droplets, wind currents or direct physical contact with people, animals or other objects. Dirt can be either organic or inorganic. Examples of dirt particles include sand, smoke particles, dust, metallic fibres, carbon black, rust, grease, pollen, human detritus and fungal spores. Dirt particles attract moisture to the surface of the coating. This moisture provides a suitable environment in which microbial spores may survive and proliferate into colonies, thus further contributing to the unsightly appearance of the surface coating.

To meet evolving industry demands for lower VOC coatings (response to more stringent environmental regulations), broader application window (acceptable film formation/performance at low ambient application temperature) and longer service life (less maintenance/replacement), it is useful to lower the Tg of the coating binders. Lowering the Tg, however, generally exacerbates the dirt pick-up resistance problem. An effective dirt pick up resistance technology which is suitable for these softer, low VOC coatings and which does not compromise the required application and performance properties of surface finishes is a common goal of the architectural paint industry.

The composition and formulation factors affecting a coating's affinity or repellency for dirt are generally known to those skilled in the art and have been reviewed by Smith and Wagner (J. Coat. Tech. 1996, 68, 862, 37–42). The following paragraphs highlight some of those coatings features which may directly or indirectly impact dirt pick up resistance of decorative and protective coatings.

It is more difficult for dirt to adhere to a hard surface. A coating can be rendered harder by several means, including increasing the glass transition temperature (Tg), crosslinking the coating, or blending harder polymers or additives into the coating composition. These approaches often introduce technical challenges in their practical application, however. Increasing the hardness of a coating may result in, for example, poor film formation, unacceptable film cracking, or poor crack bridging. To overcome such problems, additional coalescent or plasticizer may be added, but at the expense of VOC demand and dry time. Introducing crosslinking into the coating composition can also make the coating film too brittle or might require complicated and costly two component technology. In blending harder polymers or additives into the coating composition it is sometimes difficult to achieve a satisfactory degree of compatibility and blend stability in order to promote film homogeneity and good appearance. Again, VOC and film formation characteristics can be adversely affected.

The surface energy of a coating can influence its dirt pickup resistance. Lower surface energy films repel water which can be a carrier for dirt. Hydrophobic films, likewise, may improve dirt pickup resistance by repelling water more effectively than hydrophilic films and minimizing the water swelling or softening of the coating. Incorporation of fluorine and silicon derivatives as monomers or post additives effectively reduces surface energy and may increase hydrophobicity as well. Incorporation of these monomers into conventional emulsion coatings polymers at levels sufficient to bring about the desired dirt repellency enhancements can add significant cost to the polymer product.

The dirt pick up resistance of a film can be affected by the smoothness or roughness of a film surface. Dirt can become permanently trapped, for instance, in gaps, cavities, fissures and cracks located at the surface of a coating. Coatings with good film formation over a broad range of temperature and humidity conditions and adequate extensibility for use on dimensionally unstable substrates, such as wood, are necessary to prevent mechanical film failures, such as cracking. Typically, lowering either the Tg or molecular weight or both can provide the film formation requirements; however, both these strategies may adversely influence dirt pick-up resistance.

Photodegradation can promote the formation of low molecular weight moieties which are tacky or soft, thus encouraging adherence of dirt. Photoactive additives such as UV absorbers and light stabilizers are often used to prevent the degradation of both the polymer and substrate. However, these types of additives can be lost over time through volatilization or chemical reactions and therefore do not offer long term protection.

Dirt can also be rendered harmless if the film could be washable or is self-cleaning. Dirt which is embedded or strongly adhered to a coating surface can be very difficult to remove either by natural or mechanical washing. Coatings which are designed to slough off or shed their surface layers eventually endanger the substrate by exposing it to the environment.

Several methods have been proposed for addressing the problem of the adherence of dirt in coatings. EP 0 672 735 discloses a method to improve the dirt pickup resistance of a coating by using a single stage polymer comprised of multiple monomers having glass transition temperatures of from −20° C. to 40° C. However, this method does not provide dirt pickup resistance across a wide range of glass transition temperatures while, at the same time, being able to maintain desired coatings performance properties.

In dealing with the specific problem of dirt pickup resistance on coatings, the principle zone of activity is the surface of the coating. What is needed, therefore, is a composition which can be incorporated into the liquid coating formulation to impart the desired dirt-resistant coating feature and which has utility over a broad range of compositions and end uses, including applications where very low Tg polymers are required.

The present invention comprises a composition for improving the dirt pick up resistance properties of a coating. The composition comprises polymeric nanoparticles ("PNP") having a mean particle diameter of from 1 to 50 nanometers ("nm"), the PNPs typically consisting of from 1 to 95.5%, by weight, of at least one multi-ethylenically unsaturated monomer and at least one ethylenically unsaturated water soluble monomer. Preferably, the PNPs have a mean diameter of from 1 to 30 nm and most preferably from 1 to 10 nm in diameter.

While not being bound to a particular theory, PNPs according to the invention, having specified composition or pendant functional groups, will, due to their very small-size and high surface area relative to traditional polymer latexes, tend to enhance the effectiveness of the desired functionalities at the surface of the dried or cured coating. PNPs can be used alone or in conjunction with other latex binders to produce clear and pigmented coatings with improved resistance to the build-up of particulate matter depending on the selection of composition and functionalities. PNPs may be used to modify the surface characteristics of a coating composition by, for example, increasing surface hardness or toughness, minimizing surface degradation, or lowering surface energy to reduce a coating's affinity for particulate matter by promoting a cleanable or self-cleaning coating.

In a second embodiment, to increase surface hardness of a coating composition, PNPs are present in a coating formulation which are comprised of a monomer composition having a glass transition temperature (Tg) at least 5° C., and preferably greater than 10° C. higher than that of other binders in the formulation.

In a third embodiment, the PNPs may be functionalized with photosensitive moieties. The PNP contains at least one photosensitive monomer. Photosensitive monomers include photoinitiator monomers which, on exposure to UV, generate radicals or ions which promote crosslinking of the polymer coating. UV absorbing and radical scavenging photosensitive monomers protect the polymer coating from UV degradation by neutralizing (or rendering_iketone_al) destructive UV light or free radicals. Photosensitive monomers are well known in the art and include vinyl aromatics such as vinyl toluene, vinyl benzophenone and acryloxybenzophenone. Suitable photoinitiator monomers are disclosed in U.S. Pat. No. 5,248,805 and 5,439,970. The level of the photoinitiator monomer contained as polymerized units in the PNP may range from 0.1 to 90%, preferably 0.5 to 25%, based on the total weight of the PNP.

Other photosensitive functional groups include monoethylenically unsaturated derivatives of substituted benzophenones or acetophenones which are prepared by reaction with a vinyl benzyl halide, to form homopolymers or copolymers. These monoethylenically unsaturated vinyl or vinylidene monomers readily cross-link upon exposure to ultra-violet radiation.

Additional photosensitive functional groups include ethylenically unsaturated derivatives of substituted benzophenones of structures I and II:

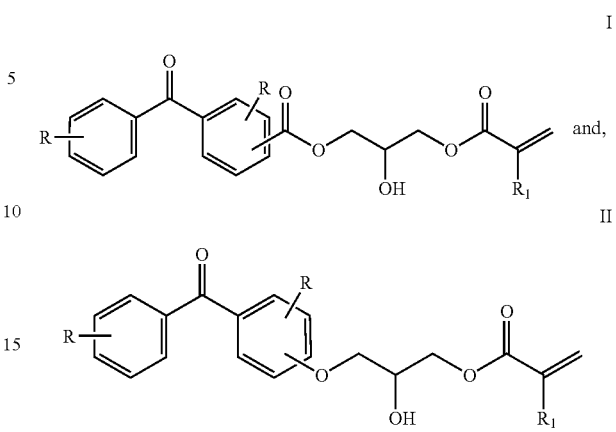

wherein R is a radical selected from the group consisting of the hydrogen, alkyl and aryl radicals and R1 is a radical selected from the group consisting of the hydrogen and methyl radicals. Some examples of these functional groups include (2-hydroxy-3-methacryloxy)propyl Ortho-benzoylbenzoate; (2-hydroxy-3-acryloxy)propoxy para-benzoylbenzene and (2-hydroxy-3-acryloxy)propoxy Ortho-methyl-para-benzolybenzene.

Additional photosensitive monomers capable of absorbing some portion of the solar light spectrum may be present as copolymerized ethylenically unsaturated monomers. Such monomers include allyl benzoylbenzoates and copolymerizable monomers incorporating pendant benzophenone radicals. Preferred are vinylbenzenyl methylbenzolybenzoate, hydroxymethacryloxypropyl methylbenzoate and hydroxymethacryloxypropoxy benzophenone.

A fourth embodiment of the invention comprises preparing PNPs with pendant or residual ultraviolet ("UV") or oxidatively curable functionalities or moieties. This can be accomplished by introducing specific compounds during or after the polymerization of the composition. Compounds used to incorporate these moieties into a PNP will be present at levels from 1–90%, preferably 2–50% and more preferably 2–25% by weight, based on the weight of the PNP.

Preferred UV curing compounds for incorporation during polymerization contain at least two sites of unsaturation. Most preferred are compounds wherein the sites of unsaturated are of unequal reactivity. Examples of these polyfunctional groups are allyl, methallyl, vinyl, crotyl-esters of acrylic, methacrylic, maleic, fumaric and itaconic acids; allyl, methally and crotyl-vinyl ether and thioether; N— and N,N-diallyl, crotyl-, O-alkyl-, aryl-, P-vinyl, P-allyl, P-crotyl- and P-methallyl-phosphonates; and, cycloalkenyl esters of acrylic, methacrylic maleic (mono and diesters), fumaric (mono and diesters) and itaconic (mono and diesters) acids.

Other monomers which may be used to prepare UV or air curing polymers include acryloxymethyl fatty compounds, vinyl monomers made from ricinoleic acid and mixed fatty acids of castor oil, acrylic monomers made from castor oil and methyl ricinoleate and acrylate esters of various hydroxy acid derivatives obtained from castor oil. Additionally, of utility are acrylate or methacrylate esters of hydroxy olefinic compounds derived from castor oil or lesquerella oil.

Another class of post-curable monomers are derived from either non-drying or semi-drying oils. Examples of non-drying oils include cottonseed oil, coconut oil, rapeseed oil, castor oil and lesquerella oil. Examples of semi-drying oils include safflower oil, sunflower oil, soybean oil and tobacco seed oil.

Acetoacetate-containing monomers are another desired group. Preferred as an active methylene monomer is an ethylenically-unsaturated monomer bearing acetoacetate functionality. Examples of monomers useful for introduction of acetoacetate functionality are acetoacetoxyethyl acrylate, acetoacetoxyethyl methacrylate (AAEM), acetoacetoxypropyl methacrylate (AAPM), allyl acetoacetate, acetoacetoxybutyl methacrylate, 2,3-di(acetoacetoxy)propyl methacrylate and the like. In general, any polymerizable hydroxy functional monomer can be converted to the corresponding acetoacetate by reaction with a suitable acetoacetylating agent (See e.g. *Comparison of Methods for the Preparation of Acetoacetylated Coating Resins*, Witzeman, J. S.; Dell Nottingham, W.; Del Rector, F. J. Coatings Technology; Vol. 62, 1990, 101). The acetoacetyl-functional polymeric binders are treated with an excess of a stoichiometric amount of ammonia or primary amine to form enamine, which may react more quickly when exposed to ultraviolet light than an untreated sample of the same acetoacetyl functional polymer.

PNP's containing residual unsaturation or other post-crosslinking functionalities can be prepared by post-functionalization of a preformed PNP composition provided suitable complementary functionalities are present on the PNP and the reactive functionality. For one example, a carboxyllic acid functionalized PNP can be post-reacted with glycidyl methacrylate under specific conditions to yield a PNP with pendant methacrylate groups suitable for post UV curing.

The UV or air curing PNP's can be used alone or blended into a variety of polymer matrices. Catalysts, metal driers, UV absorbers, etc. may be added, as is commonly practiced in the industry, at low levels to facilitate curing. UV curable PNP's can be added to UV curable acrylics, polyesters or polyurethanes to modify crosslink density, hardness, surface energy, among other properties of the coating. Linseed-oil modified PNP's, or example, can be blended into coating formulations to promote improved dirt pick-up resistance on subsequent air curing of the coating.

A fifth embodiment of the invention comprises functionalizing the PNPs with either fluorine or silicon moieties. Fluorine is known to provide low surface energy, water repellency, and infrared reflection. Fluorinated PNPs may contain 0.1–70%, preferably 1–40%, and most preferably 1–20% fluorinated monomer in the composition. The fluorinated PNPs may contain more than one fluorinated monomer in the composition. The fluorinated PNPs may also contain silicon, multivalent metals, photoinitiator monomers, hydrophobic unsaturated monomers or ethylenically unsaturated monomers in the composition. Fluorinated monomers include, but are not limited to, vinyl fluoride, vinylidene fluoride, tetrafluoroethylene, fluorocinnamic acid, fluoroacrylates, fluoromethacrylates and vinyl aromatic fluoromonomers.

Silicon is also known to provide low surface energy, water repellency, oil repellency and infrared reflection. Some silicon-containing compounds promote crosslinking which may further enhance dirt pick up resistance. Silicon containing PNPs may contain 0.1–70%, preferably 1–40% and most preferably 1–20% silicon monomer in the composition. The silicon containing PNPs may have more than one silicon containing monomer in the composition. The silicon containing PNPs may also contain fluorine, multivalent metals, photoinitiator monomers, hydrophobic unsaturated monomers or ethylenically unsaturated monomers in the composition. Silicon monomers include, but are not limited to, γ-propyl tri(C1–C6)alkoxysilyl(meth)acrylate, γ-propyl tri(C1–C6)alkylsilyl(meth)acrylate, γ-propyl di(C1–C6) alkoxy(C1–C6)alkylsilyl(meth)acrylate, γ-propyl di(C1–C6)alkyl(C1–C6) alkoxysilxy(meth)acrylate, vinyl tri(C1–C6)alkoxysilyl(meth)acrylate, vinyl di(C1–C6) alkoxy(C1–C6)alkylsily(meth)acrylate, and divinyl Silane, trivinyl Silane, dimethyl divinyl Silane, divinyl methyl Silane, methyl trivinyl Silane, diphenyl divinyl Silane, divinyl phenyl Silane, poly(methyl vinyl siloxane), poly(vinyl hydro siloxane), poly (phenyl vinyl siloxane) and mixtures thereof.

In a sixth embodiment, hydrophilic moieties may be incorporated into PNPs to promote a more cleanable or self-cleaning coating. The incorporation of hydrophilic compounds may additionally enhance stability of the PNP. As such, these compounds are herein referred to as hydrophilic groups, stabilizers, stabilizing groups or stabilizing monomers. The hydrophilic moieties include, but are not limited to, hydroxyfunctional monomers, such as hydroxyethyl methacrylate, hydroxyethyl acrylate, and higher alkyl hydroxy monomers; (meth)acrylamides; carboxylic acid monomers and salts thereof, such as acrylic acid and methacrylic acid; sulfur acid monomers and salts thereof, such as sodium vinyl sulfonate, acrylamidopropyl sulfonate, sulfoethyl methacrylate, and sodium styrene sulfonate; phosphorous acid monomers and salts thereof, such as phosphoethyl methacrylate; poly-alkyleneoxide monomers, such as polyethylenegylcol (meth)acrylate, and polypropyleneglycol (meth)acrylate; polymerizable surfactants, such as Hitenol® BC from Dai-Ichi Kogyo Seiyaku Co., Ltd., and TREM LF-40 from Cognis; electrosteric monomers, such as terminally unsaturated acid containing macromonomers as disclosed in U.S. Pat. No. 5,710,227; amine monomers (such as DMAEMA and DMAPMAM); amphoteric monomers; and, surfactant monomers. Also included are reactable ionizable acid groups such as for example, acrylic, methacrylic, itaconic, aconitic, citraconic, crotonic, maleic, fumaric, the dimer of acrylic acid, vinyl sulfonic acid, acrylamide-2-methylpropanesulfonic acid (AMPS), phosphonoethyl methacrylate (PEM), and sulfonoethyl methacrylate (SEM).

The formation of PNPs bearing polyethylene glycol groups may be achieved by the introduction of polymerizable polyethylene glycol monomers during all or part of the free radical polymerization portion of the PNP preparation. A preferred group of polymerizable polyethylene glycol monomers useful in the present invention includes:

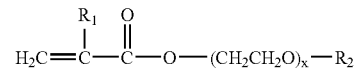

wherein $R_1$ and $R_2$ are preferably H or $CH_3$ and x is preferably 4 to 100 and, more preferably, 4–40. The polymerizable group need not be limited to (meth)acrylate but may include other ethylenically unsaturated groups subject to polymerization by free-radical processes. These groups potentially include vinyl, styrenic, fumaric, itaconic, etc. The choice of unsaturated group may be affected by its reactivity relative to other ethylenically unsaturated monomers used to form the PNP. Alternately $R_2$ may be a group containing ethylenic unsaturation.

Hydrophilic groups may be incorporated into a PNP by post functionalization methods. A monomer bearing a first reactable group, the co-reactive monomer, is incorporated into the PNP during the free radical polymerization portion of the preparation. At some point, a modifying compound bearing the second reactable group, the co-reactive stabilizer, is combined with the co-reactive monomer to tightly associate the stabilizing group with the PNP.

A stoichiometric excess of the first complementary reactable group may be present relative to the second complementary group in the co-reactive hydrophilic stabilizer. In this aspect of the invention the weight of co-reactive stabilizer for which a stoichiometric equivalent of complementary reactable group is present in the PNP preferably comprises equal to or greater than 0.5% by weight based on the total weight of polymer, of the PNP composition. A stoichiometric excess of the co-reactive stabilizer containing the second reactable group may be present relative to the first reactable group. The co-reactive stabilizer containing the second reactable group is present in the coating formulation at the level of from 0.01 to about 10 molar equivalent, based on the combined molar equivalent of the first reactable group in the PNP and other polymer(s) in the paint formulation. More preferably, the modifying compound is present at the level of from 0.1 to 1.0 molar equivalent.

Stabilizing monomers and stabilizing groups introduced via complementary reactable groups may each be present singly or in combination with each other in the PNP composition.

Additional hydrophilic groups may be derived from amphiphilic compounds including, quaternary salt of Ethomeen® 0/25 supplied by Akzo Chemicals Inc. This salt is a quaternary polyethoxylated ammonium salt with the formula $C_{18}H_{35}(CH_3)N(CH_2CH_2O)_xH(CH_2CH_2O)_yH(I)$ where x+y=15 and a molecular weight of about 942. Another useful amphiphilic compound is Triton® RW-150 supplied by Union Carbide Company with the formula $t-C_{12-14}NH(CH_2CH_2O)_{15}H$, which is a polyethoxylated amine. A preferred amphiphilic compound is a tertiary polyethoxylated amine with the formula $C_{18}H_{37}N(CH_2CH_2O)_xH(CH_2CH_2O)_yH(x+y=15)$ and a molecular weight of about 929 (Ethomeen® 18/25 supplied by Akzo Chemical Inc.). The amine is the second retractable group which is combined and reacted with a PNP containing an acid as the first reactable group.

A preferred covalently bonded pair of complementary reactable groups is a JEFFAMINE® ED-600 (supplied by the Texaco Chemical Company) modifying compound reacted with an acetoacetate containing PNP.

A preferred covalently bonded pair of complementary reactable groups is a JEFFAMINE® ED-600 (supplied by the Texaco Chemical Company) modifying compound reacted with an acetoacetate containing latex (see Example 13). JEFFAMINE® ED-600 is a polyether diamine based on a predominatly polyethylene oxide backbone. The amine (JEFFAMINE® ED-600) is the second reactable group which is reacted with a PNP containing acetoacetate as the first reactable group.

These ionic or covalent bonds can be formed by the combination of the compounds containing the complementary reactable groups prior to, during, or after the free radical polymerization portion of the PNP preparation. An example of combination of the compounds containing the complementary reactable groups prior to the free radical polymerization portion of the PNP time prior to their introduction to a reaction apparatus in which the free radical polymerization portion of the PNP preparation occurs. An example of preparation would be the combination of AAEM and Ethomeen® 18/25 at any combination of the compounds containing the complementary reactable groups during the free radical polymerization portion of the PNP preparation would be the introduction of Ethomeen® 18/25 to a reaction apparatus in which the free radical polymerization portion of a PNP preparation, in which AAEM is one ethylenically unsaturated monomer, is proceeding. Combination of the compounds containing complementary reactable groups could also proceed at any time after completion of the free radical polymerization portion of the PNP preparation, a procedure hereinafter referred to as post-functionalization of a PNP.

If the PNP is to be used in a coating formulation in combination with another polymer, or polymers, the post-functionalization of the PNP can proceed before or after the combination of the PNP with the other polymer(s). The post-functionalization of the PNP can likewise proceed at any point in the formulation and use of a coating composition, up to and including the point of application to a substrate. Optionally, the polymer(s) with which the PNP is being combined may contain reactable groups complementary to that in the coreactive stabilizer.

Incorporation of starches, sugars, hydroxyethylcellulose and other water soluble cellulosics, poly-vinyl alcohols, poly-alkylene oxides, and other colloidal stabilizers might graft into the PNPs if present during all or part of the free radical polymerization portion of the PNP synthesis. These materials could also be modified to include functionality to react with complementary reactable groups introduced to the PNP during the free radical polymerization portion of the PNP preparation. If used, these materials would preferably comprise at least 1% by weight based on the total weight of polymer, of the PNP composition.

The foregoing embodiments of the invention may be practiced independently or they may be combined, as desired, to provide a coating formulation having optimum dirt pick up resistance characteristics.

The polymer PNP-modified coating may comprise additional ingredients, such as thickeners, rheology modifiers, surfactants, pigments, flatting aids, waxes, slip aids, coalescents and/or plasticisers, humectants, tackifiers, wetting aids, antifoaming agents, colorants, and antioxidants, such materials being typical ingredients of water based paints and coatings. The coating composition may also include a post cross-linking agent such as polyaziridine, polyisocyanate, polycarbodiimide, polyepoxide, polyaminoplast, polyalkoxysilane, polyoxazolidine, polyamine and polyvalent metal compounds, to improve the dirt resistance of the cured water based coating once it has been applied to the substrate.

The aqueous composition of the present invention includes an aqueous dispersion of polymeric particles having a mean diameter in the range of from 1 to 50 nanometers (nm), the particles including, as polymerized units, at least one multiethylenically unsaturated monomer and at least one ethylenically unsaturated water soluble monomer. As used herein, the term "dispersion" refers to a physical state of matter that includes at least two distinct phases wherein a first phase is disturbed in a second phase, the second phase being a continuous medium. By "aqueous" herein is meant a medium that is from 50 to 100 weight % water, based on the weight of the aqueous medium.

The polymeric particles, referred to herein as polymeric nonoparticles ("PNPs"), are addition polymers, which contain, as polymerized units, at least one multiethylenically unsaturated monomer and at least one ethylenically unsaturated water soluble monomer. Suitable multiethylenically unsaturated monomers useful in the present invention include di-, tri-, tetra-, or higher multifunctional ethylenically unsaturated monomers, such as, for example, divinyl benzene, trivinylbenzene, divinyltoluene, divinylpyridine, divinylnaphthalene divinylxylene, ethyleneglycol di(meth) acrylate, trimethylolpropane tri(meth)acrylate, diethyleneglycol divinyl ether, trivinylcyclohexane, allyl (meth)acrylate, diethyleneglycol di(meth)acrylate, propyleneglycol di(meth)acrylate, 2,2-dimethylpropane-1,3-di(meth)acrylate, 1,3-butylene glycol di(meth)acrylate, 1,4-butanediol di(meth)acrylate, 1,6-hexanediol di(meth)acrylate, tripropylene glycol di(meth)acrylate, triethylene glycol di(meth) acrylate, tetraethylene glycol di(meth)acrylate, polyethylene glycol di(meth)acrylates, such as polyethylene glycol 200 di(meth)acrylate and polyethylene glycol 600 di(meth)acrylate, ethoxylated bisphenol A di(meth)acrylate, poly(butanediol) di(meth)acrylate, pentaerythritol tri(meth)acrylate, trimethylolpropane triethoxy tri(meth)acrylate, glyceryl propoxy tri(meth)acrylate, pentaerythritol tetra(meth)acrylate, dipentaerythritol monohydroxypenta(meth)acrylate, divinyl silane, trivinyl silane, dimethyl divinyl silane, divinyl methyl silane, methyl trivinyl silane, diphenyl divinyl silane, divinyl phenyl silane, trivinyl phenyl silane, divinyl methyl phenyl silane, tetravinyl silane, dimethyl vinyl disiloxane, poly(methyl vinyl siloxane), poly(vinyl hydro siloxane), poly(phenyl vinyl siloxane), and mixtures thereof The term "(meth)acrylic" includes both acrylic and methacrylic and the term "(meth)acrylate" includes both acrylate and methacrylate. Likewise, the term "(meth)acrylate" includes both acrylate and methacrylate. Likewise, the term "(meth) acrylamide" refers to both acrylamide and methacrylamide. "Alkyl" includes straight chain, branched and cyclic alkyl groups.

Typically, the PNPs contain at least 1% by weight based on the weight of the PNPs, of at least one polymerized multiethylenically unsaturated monomer. Up to and including 99.5 weight % polymerized multiethylenically unsaturated monomer, based on the weight of the PNPs, is effectively used in the particles of the present invention. It is preferred that the amount of polymerized multiethylenically unsaturated monomer is from 1% to 80%, more preferably from 1% to 60%, most preferably from 1% to 25%, by weight based on the weight of the PNPs.

The PNPs further contain, as polymerized units, at least one water soluble monomer. By "water soluble monomer" herein is meant a monomer having a solubility in water of at least 7 weight %, preferably at least 9 weight %, and most preferably as least 12 weight %, at a temperature of 25° C. Data for the water solubility of monomers is found, for example, in "Polymer Handbook" (Second Edition, J. Brandup, E.H. Immergut, Editors, John Wiley & Sons, New York) and "Merck Index" (Eleventh Edition, Merck & Co, Inc., Rahway, New Jersey). Examples of water soluble monomers include ethylenically unsaturated. ionic monomers and ethylenically unsaturated water soluble nonionic monomers. Typically, the amount of the polymerized water soluble monomer is at least 0.5 weight %, based on the weight of the PNPs. Up to and including 99 weight % polymerized water soluble monomer, based on the weight of the PNPs, can be effectively used in the particles of the present invention.

Ethylenically unsaturated ionic monomer, referred to herein as "ionic monomer" is a monomer that is capable of bearing an ionic charge in the aqueous medium in which the PNPs are dispersed. Suitable ionic monomers include, for example, acid-containing monomers, base-containing monomers, amphoteric monomers; quaternized nitrogen-containing monomers, and other monomers that can be subsequently formed into ionic monomers, such as monomers which can be neutralized by an acid-base reaction to form an ionic monomer. Suitable acid groups include carboxylic acid groups and strong acid groups, such as phosphorus containing acids and sulfur containing acids. Suitable base groups include amines. It is preferred that the amount of polymerized ionic monomer based on the weight of the PNPs is in the range from 0.5 to 99 weight %, more preferably in the range of from 1 to 50 weight %, even more preferably from 2 to 40 weight %, and most preferably from 3 to 25 weight %.

Suitable carboxylic acid-containing monomers include carboxylic acid monomers, such as (meth)acrylic acid, acryloxypropionic acid, and crotonic acid; dicarboxylic acid monomers, such as itaconic acid, maleic acid, fumaric acid, and citraconic acid; and monomers which are half esters of dicarboxylic acids, such as monomers containing one carboxylic acid functionality and one $C_{1-6}$ ester. Preferred are acrylic acid and methacrylic acid. Suitable strong acid monomers include sulfur acid monomers, such as 2-acrylamido-2-methyl propane sulfonic acid, styrene sulfonic acid, vinyl sulfonic acid, sulfoethyl (meth)acrylate, sulfopropyl (meth)acrylate, 2-acrylamido-2-methyl propane sulfinic acid, styrene sulfinic acid, and vinyl sulfinic acid; and phosphorus acid monomers, such as 2-phosphoethyl (meth) acrylate, vinyl phosphoric acid, and vinyl phosphinic acid. Other acid monomers include terminally unsaturated acid containing macromonomers as disclosed in U.S. Pat. No. 5,710,227. Phosphorus acid monomers are desirable as they can provide improved adhesion to certain substrates (e.g., metal).

Suitable base-containing monomers include monomers having amine functionality, which includes N,N-dimethylaminoethyl (meth)acrylate, N,N-diethylaminoethyl(meth)acrylate, N-t-butylaminoethyl (meth)acrylate, N,N-dimethylaminopropyl(meth)acrylamide, p-aminostyrene, N,N-cyclohexylallylamine, allylamine, diallylamine, dimethylallylamine, N-ethyldimethylallylamine, crotyl amines, and N-ethylmethallylamine; monomers having pyridine functionality, which includes 2-vinylpyridine and 4-vinylpyridine; monomers having piperidine functionality, such as vinylpiperidines; and monomers having imidazole functionality, which includes vinyl imidazole. Other suitable base-containing monomers include oxazolidinylethyl(meth) acrylate, vinylbenzylamines, vinylphenylamines, substituted diallylamines, 2-morpholinoethyl(meth)acrylate, methacrylamidopropyl trimethyl ammonium chloride, diallyl dimethyl ammonium chloride, 2-trimethyl ammonium ethyl methacrylic chloride, and the like.

Suitable amphoteric monomers include N-vinylimidazolium sulfonate inner salts and N,N-Dimethyl-N-(3-methacrylamidopropyl)-N-(3-sulfopropyl)ammonium betaine.

Suitable functional monomers, in which the functionality is subsequently formed into an acid or base include monomers containing: an epoxide functionality, such as glycidyl (meth)acrylate and allyl glycidyl ether; an anhydride, such as maleic anhydride; an ester; and a halide. Suitable halide-containing functional monomers include vinylaromatic halides and halo-alkyl(meth)acrylates. Suitable vinylaromatic halides include vinylbenzyl chloride and vinylbenzyl bromide. Other suitable functional monomers include allyl chloride, allyl bromide, and (meth)acrylic acid chloride. Suitable halo-alkyl(meth)acrylates include chloromethyl (meth)acrylate. Suitable functionable monomers, in which the functionality is subsequently forming into a nonionic water soluble group, include vinyl acetate. Hydrolysis of the polymerized vinyl acetate provides hydroxyl groups to the PNPs.

Multiethylenically unsaturated monomers that are also water soluble monomers are alternatively used to prepare the PNPs. In such embodiments, these monomers are classified for the purposes of the present invention as both a multi-ethylenically unsaturated monomer and a water soluble monomer. An example of a water soluble, multiethylenically unsaturated monomer is phosphodi(ethyl methacrylate).

Ethylenically unsaturated water soluble nonionic monomers are referred to herein as "water soluble nonionic monomers". Examples of water soluble nonionic monomers include hydroxyalkyl (meth)acrylates such as hydroxyethyl nonionic monomers include hydroxyalkyl(meth)acrylate; poly(alkylene oxide)esters of (meth)acrylic acid such as poly(ethylene oxide)$_{20}$ methacrylate and poly(propylene oxide)$_{150}$ acrylate; acrylamide; and methacrylamide. It is preferred that the amount of polymerized water soluble nonionic monomer based on the weight of the PNPs is in the range from 0.5 to 99 weight %, more preferably in the range of from 20 to 90 weight %, even more preferably from 30 to 80 weight %, and most preferably from 40 to 70 weight %. When the PNPs include, as polymerized units, ionic monomer and nonionic water soluble monomer, lower levels of polymerized nonionic water soluble monomer are preferred.

The PNPs optionally contain, as polymerized units, one or more third monomers that are not multiethylenically unsaturated monomers and are not water soluble monomers. Suitable third monomers include $C_1$–$C_{24}$ alkyl(meth)acrylates, such as methyl (meth)acrylate, ethyl(meth)acrylate, propyl(meth)acrylate, butyl(meth)acrylate, isobutyl(meth) acrylate, hexyl(meth)acrylate, cyclohexyl(meth)acrylate, 2-ethylhexyl(meth)acrylate, octyl(meth)acrylate, decyl (meth)acrylate, dodecyl(meth)acrylate, pentadecyl(meth) acrylate, hexadecyl(meth)acrylate, octadecyl(meth)acrylate, and nonadecyl(meth)acrylate, and mixtures thereof. Other suitable third monomers include vinyl acetate; vinyl versatate; diisobutylene; ureido containing monomers such as N-(ethyleneureidoethyl)-4-pentenamide, N-(ethylenethio-ureido-ethyl)-10-(ethylenethioureido ethyl) 10 undecenamide, butyl ethyleneureido-ethyl fumarate, methyl ethyleneureido-ethyl fumarate, benzyl N-(ethyleneureido-ethyl) fumarate, and benzyl N-(ethleneureido-ethyl)maleamate; vinylaromatic monomers, such as styrene, α-methylstyrene, vinyltoluene, p-methylstyrene, ethylvinylbenzene, vinylnaphthalene, vinylxylenes, and nonylphenoxy propenyl polyethoxylated alcohol. The vinylaromatic monomers also include their corresponding substituted counterparts, such as halogenated derivatives, i.e., containing one or more halogen groups, such as fluorine, chlorine or bromine; and nitro, cyano, ($C_1$–$C_{10}$)alkoxy, halo($C_1$–$C_{10}$)alkyl, ($C_1$–$C_{10}$) alkoxy, carboxy, and the like.

The PNPs have a mean diameter in the range of from 1 to 50 nm, preferably in the range of from 1 to 40 nm, more preferably from 1 to 30 nm, even more preferably from 1 to 25 nm, even further preferably from 1 to 20 nm, and most preferably from 1 to 10 nm. It is further typical that the PNPs have a mean particle diameter of at least 1.5 nm, preferably at least 2 nm. One method of determining the particle sizes (mean particle diameter) of the PNPs is by using standard dynamic light scattering techniques, wherein the correlation functions are converted to hydrodynamic sizes using LaPlace inversion methods, such as CONTIN.

Typically, PNPs including as polymerized units, less than 10 weight % multiethylenically unsaturated monomer, have a glass transition temperature from –90° C. to 170° C. for the composition in the absence of the polymerized multiethylenically unsaturated monomer, as determined by a modulated DSC measurement. PNPs containing as polymerized units, at least 50 weight % multiethylenically unsaturated monomer are considered to have glass transition temperatures of at least 50° C.

The PNPs of the present invention typically have an "apparent weight average molecular weight" in the range of 5,000 to 1,000,000, preferably in the range of 10,000 to 500,000 and more preferably in the range of 15,000 to 100,000. As used herein, "apparent weight average molecular weight" reflects the size of the PNP particles using standard gel permeation chromatography methods, e.g., using THF solvent at 40° C., 3 Plgel™ Columns (Polymer Labs, Amherst, Mass.), 100 Angstrom (10 nm), $10^3$ Angstroms (100 nm), $10^4$ Angstroms (1 micron), 30 cm long, 7.8 mm ID, 1 milliliter per minute, 100 microliter injection volume, calibrated to narrow polystyrene standards using Polymer Labs CALIBRE™ software.

The PNPs are optionally characterized as having suitable hydrophilicities that allow the PNPs to be dispersed into an aqueous medium. One method to characterize the hydrophilicity of the PNPs is to calculate the Hansch parameter. The Hansch parameter is calculated using a group contribution method. The monomer units forming the polymer are assigned a hydrophobicity contribution and the relative hydrophobicity of the polymer is calculated based on the weight average of the monomers in the polymer. Hansch and Fujita, *J. Amer. Chem. Soc.*, 86, 1616–1626 (1964); H. Kubinyi, *Methods and Principles of Medicinal Chemistry*, Volume 1, R. Mannhold et al., Eds., VCH, Weinheim (1993); C. Hansch and A. Leo, *Substituent Constants for Correlation Analysis in Chemistry and Biology*, Wiley, N.Y. (1979); and C. Hansch, P. Maloney, T. Fujita, and R. Muir, Nature, 194. 178–180 (1962).

Values of the hydrophobicity contributions for several monomers are listed in Table 1.

TABLE 1

| Monomer | Hydrophobicity Contribution |
|---|---|
| ethyl acrylate | 2.11 |
| butyl acrylate | 3.19 |
| 2-ethyl hexylacrylate | 5.22 |
| styrene | 4.29 |
| methyl methacrylate | 1.89 |
| ethyl methacrylate | 2.43 |
| butyl methacrylate | 3.51 |
| isobornyl methacrylate | 5.0 |
| butadiene | 4.0 |
| acrylic acid | –2.52 |
| methacrylic acid | –2.2 |
| maleic anhydride | –3.5 |

Preferred PNPs have a Hansch parameter in the range of from –2.5 to 4, preferably from –1 to 3.

The PNPs optionally contain other functional groups, which are provided by the polymerization of monomers containing those groups or precursor groups thereof. Functional groups are optionally attached to the PNPs by reacting the ionic group of the PNP with a suitable compound. For example, PNPs containing carboxylic acid groups are modified to contain pendant hydrophilic groups by reacting carboxylic acid groups with a suitable alcohol, such as a capped polyalkylene oxide. Alternatively, functional groups are affixed to the PNPs through non-radical reactions resulting in the formation of ionic or covalent bonds between a modifying compound containing the groups and complementary reactable groups covalently bound to the PNP as taught in U.S. Pat. No. 5,270,380.

The complementary reactable groups in the PNP and modifying compound provide ionic or covalent bonding. Complementary ionic bonding includes acid-base interaction and ion pair bonding of negatively and positively charged atoms. Covalent bonding by complementary reactable groups includes, for example: (a) acetoacetate-aldehyde; (b) acetoacetate-amine; c) amine-aldehyde; (d) amine-anhydride; (e) amine-isocyanate; (f) amine-epoxy; (g) aldehyde-hydrazide; (i) acid-epoxy; (j) acid-carbodiimide; (k) acid-chloro methyl ester; (j) acid-chloro methyl amine; (m) acid-anhydride; (n) acid-aziridine; (o) epoxy-mercaptan; and (p) isocyantate-alcohol. The first or second reactable group in each pair is present either in the PNP or, alternatively, in the modifying compound.

A suitable method to prepare the aqueous composition containing the PNPs dispersed in an aqueous medium includes the steps of preparing a nonaqueous PNP dispersion containing the PNPs dispersed in at least one solvent; and combining the nonaqueous PNP dispersion with an aqueous medium. By "nonaqueous" herein is meant a medium that contains from zero to less than 50 weight % water, based on the weight of the nonaqueous medium. Aqueous compositions containing PNPs that include, as polymerized units, ionic monomers, are optionally partially or completely neutralized prior to, during, or after combining with the aqueous medium.

A suitable polymerization process to prepare the nonaqueous PNP dispersion is free radical solution polymerization of at least one multiethylenically unsaturated monomer, at least one water soluble monomer, and optionally, at least one third monomer By "solution polymerization" herein is meant free radical addition polymerization in a suitable solvent for the polymer. By "suitable solvant for the polymer" herein is meant that liner random (co)-polymers having substantially similar polymerized monomer units to the PNPs, are soluble in the solvent. Another method for selecting a suitable solvent or mixture of solvents is on the basis of using solubility parameter analysis. According to such methods, the suitability of the solvent is determined by substantially matching the solubility parameters of the PNP and of the solvent, such as the Van Krevelen parameters of delta d, delta p, delta h and delta v. See, for example, Van Krevelen et al., *Properties of Polymers. Their Estimation and Correlation with Chemical Structure*, Elsevier Scientific Publishing Co., 1976; Olabisi et al., *Polymer-Polymer Miscibility*, Academic Press, NY, 1979; Coleman et al., *Specific Interactions and the Miscibility of Polymer Blends*, Technomic, 1991; and A. F. M. Barton, *CRC Handbook of Solubility Parameters and Other Cohesion Parameters*, $2^{nd}$ Ed., CRC Press 1991. Delta d is a measure of dispersive interactions, delta p is a measure of polar interactions, delta h is a measure of hydrogen bonding interactions, and delta v is a measure of both dispersive and polar interactions. Such solubility parameters are alternatively calculated, such as by the group contribution method, or determined experimentally, as is known in the art. A preferred solvent has a delta v parameter within 5 (joule per cubic centimeter)$^{112}$, preferably within 1 (joule per cubic centimeter)$^{1/2}$ of the polymer delta v parameter. Suitable solvents for the polymerization include organic solvents, such as hydrocarbons; alkanes; halohydrocarbons; chlorinated, fluorinated, and brominated hydrocarbons; aromatic hydrocarbons; ethers; ketones; esters; alcohols; and mixtures thereof. Particularly suitable solvents, depending on the composition of the PNP, include dodecane, mesitylene, xylenes, diphenyl ether, gamma-butyrolactone, ethyl acetate, ethyl lactate, propyleneglycol monomethyl ether acetate, supercritical CO2, caprolactone, 2-heptanone, methylisobutyl ketone, acetone, methyl ethyl ketone, diisobutylketone, propyleneglycol momomethyl ether, and alkyl-alcohols, such as isopropanol, decanol, and t-butanol; and supercritical carbon dioxide.

The nonaqueous PNP dispersion is prepared by first charging a solvent, or alternatively, a mixture of solvent and some portion of the monomers, to a reaction vessel. The monomer charge is typically composed of monomers, an initiator, and a chain transfer agent. Typically, initiation temperatures are in the range of from 55° C. to 125° C., although lower or higher initiation temperatures are possible using suitable low temperature or high temperature initators knows in the art. After the heel charge has reached a temperature sufficient to initiate polymerization, the monomer charge or balance of the monomer charge is added to the reaction vessel. The monomer charge time period is typically in the range of from 15 minutes to 4 hours, although both shorter and longer time periods are envisioned. During the monomer charge, the reaction temperature is typically kept constant, although it is possible to vary the reaction temperature. After completing the monomer mixture addition, additional initiator in solvent can be charged to the reaction and/or the reaction mixture may be held for a time.

Control of PNP particle size and distribution is achieved by one or more of such methods as choice of solvent, choice of initiator, total solids level, initiator level, type and amount of multi-functional monomer, type and amount of ionic monomer, type and amount of chain transfer agent, and reaction conditions.

Initiators useful in the free radical polymerization of the present invention include, for example, one or more of: peroxyesters, alkylhydroperoxides, dialkylperoxides, azoinitiators, persulfates, redox initiators and the like. The amount of the free radical initiator used is typically from 0.05 to 10% by weight, based on the weight of total monomer. Chain transfer reagents are optionally used to control the extent of polymerization of the PNPs useful in the present invention. Suitable chain transfer agents include, for example: alkyl mercaptans, such as dodecyl mercaptan; aromatic hydrocarbons with activated hydrogens, such as toluene; and alkyl halides, such as bromotrichloroethane.

In one method of preparing the aqueous composition of the present invention, at least a portion of the polymerized ionic monomer units of the PNPs are neutralized with at least one neutralizing agent to form an at least partially neutralized nonaqueous PNP dispersion. The polymerized ionic monomer units of the PNPs can be neutralized in a variety of ways. When the polymerized ionic monomer units are acidic, the neutralizing agent is typically a base. Likewise, when the polymerized ionic monomer units are basic, the neutralizing agent is typically an acid. Suitable bases include inorganic and organic bases. Suitable inorganic bases include the full range of the hydroxide, carbonate, bicarbonate, and acetate bases of alkali or alkaline metals. Suitable organic bases include ammonia, primary/secondary/tertiary amines, diamines, and triamines. Preferred basic neutralizing agents include sodium hydroxide, and ammonium hydroxide. Suitable acids include carboxylic acids, such as acetic acid; dicarboxylic acids; (di)carboxylic/hydroxyl acids; aromatic acids, such as benzoic acid; and a variety of other acids, such as boric, carbonic, citric, iodic, nitrous, nitric, periodic, phosphoric, phosphorous, sulfuric, sulfurous, and hydrochloric acid. None of the foregoing categories of bases and acids, are deemed to be limiting.

The amount of neutralizing agent required to neutralize the nonaqueous PNP dispersion is typically determined on a molar basis of neutralizing agent to polymerized ionic monomer units of the PNPs. Without being bound to a particular theory, the amount of polymerized ionic monomer units (i.e., level of charge) needed to stabilize the PNPs (i.e., maintain particle size during conversion from non-aqueous to aqueous medium) will vary as PNP composition and properties are varied. It is believed that the PNP hydrophobicity, Tg, crosslinking level, and type of counter-ion from the neutralizing agent are important variables. For providing stable aqueous PNP dispersions (i.e., wherein flocculation of the PNPs is minimized), the polymerized ionic monomer units are preferably at least 20%, more preferably at least 50%, even more preferably at least 80%, and most preferably at least 90% neutralized.

Neutralizing the PNPs is alternatively carried out in a variety of ways. In one method, the nonaqueous PNP dispersion is added to a solution containing the neutralizing agent while stirring. Preferably, the neutralizing agent is added as an aqueous solution over time while stirring the nonaqueous PNP dispersion to provide an at least partially neutralized nonaqueous PNP dispersion.

In one method of preparing the aqueous composition containing dispersed PNPs, the at least partially neutralized nonaqueous PNP dispersion is combined with an aqueous medium. The aqueous medium optionally contains the neutralizing agent(s) for neutralizing the PNPs, in which case the nonaqueous PNP dispersion is capable of being simultaneously neutralized and combined with an aqueous medium. The aqueous medium optionally contains surfactants, which are capable of altering the stability of the PNPs, or of altering other properties of the resulting aqueous PNP dispersion, such as its surface tension.

The sequence of admixing the partially neutralized nonaqueous PNP dispersion and the aqueous medium is not critical. Various methods and equipment, which are suitable for mixing are described in *The Chemical Engineer's Handbook, 5th Edition*, Perry and Chilton, Eds., McGraw-Hill, Ch. 21, 1973. Typically, the aqueous medium is continuously stirred while adding the partially neutralized nonaqueous PNP dispersion to it in order to ensure that the solvent is intimately mixed with the aqueous medium, which minimizes flocculation of the PNPs.

Suitable weight percentages of the PNPs in the aqueous composition, based on total weight of the aqueous composition, are typically from 1 to 90 weight %, more typically from 2 to 75 weight %, even more typically from 4 to 65 weight %, further more typically from 8 to 55 weight %, and most typically from 10 to 45 weight %.

While the preparation of the aqueous composition of the present invention does not require the use of surfactants, and it is typical that the nonaqueous PNP dispersions are substantially free of surfactants, surfactants are optionally included. When present, the amount of surfactants is typically less than 3 weight percent, more typically less than 2 weight percent, even more typically less than 1 weight percent, further typically less than 0.5 weight percent, and even further typically less than 0.2 weight percent, based on total weight of the PNPs.

The aqueous composition is optionally treated to remove at least a portion of the solvent and optionally water, to increase the solids content of the PNPs. Suitable methods to concentrate the PNPs include distillation processes, such as forming azeotropes of water and a suitable solvent; evaporation of solvent or water; drying the aqueous composition by freeze drying or spray drying; solvent extraction techniques; and ultrafiltration techniques. Preferably at least 25 weight %, more preferably at least 50 weight %, even more preferably at least 75 weight %, and most preferably 100 weight % of the solvent is exchanged with water. Removal of the solvent is preferably carried out under conditions that minimize destabilization (i.e., flocculation) of the PNPs.

In an alternative method, the aqueous composition of this invention is prepared by a method including the steps of preparing a nonaqueous PNP dispersion containing the PNPs dispersed in at least one solvent that is both a suitable solvent for the PNPs and is compatible or miscible in water; and combining the nonaqueous PNP dispersion with an aqueous medium. Examples of such suitable solvents for acrylic-containing PNPs, which are also compatible or miscible with water, include isopropanol and ether alcohols (e.g., monobutyl ether of ethylene glycol and monoethyl ether of diethylene glycol). In this method, the PNPs do not require the addition of neutralizing agents to impart particle stability when combined with water.

Alternate embodiments of the aqueous compositions of the present invention have a wide range of PNP content. Typically, the PNP weight fractions range from 0.1 to 99 weight %, more typically from 1 to 90 weight %, even more typically from 2 to 75 weight %, further typically from 5 to 50 weight %, and most typically 10 to 40 weight %, based on the weight of the aqueous composition.

The PNPs may be present in the reaction vessel during the production of larger particles of a second polymer being formed by a second polymerization This second polymerization is preferably an emulsion polymerization. An example of such a second polymerization in the presence of PNPs is the use of PNPs of the present invention as stabilizers (i.e., dispersants) in emulsion polymerizations according to the methods known for using "high acid" polymeric stabilizers (often referred to as "resin supported emulsion polymerization", such as are disclosed in U.S. Pat. No. 4,845,149 and U.S. Pat. No. 6,020,061).

Among suitable emulsion polymer compositions, any emulsion polymer, copolymer, multi-stage copolymer, interpolymer, core-shell polymer, and the like can be stabilized using the PNPs of the the present invention. While any ethylenically unsaturated monomer may be used, it is preferred that the emulsion polymers which are stabilized are prepared from at least one of (meth)acrylic ester and vinylaromatic monomers.

In carrying out emulsion polymerizations containing the PNP stabilizers of the present invention, all of the typical emulsion polymerization components, conditions, and processes can be used, e.g., any known emulsion polymerization emulsifier (soap) may be present (or even absent), initiators, temperatures, chain transfer agents, reactor types and solids content, and the like.

PNPs can as well act to stabilize larger polymeric polymers when added after the completion of formation said larger polymeric particles. In such cases it may be desirable to add the PNPs to a dispersion of larger polymer particles under conditions favorable to adsorption of the PNPs to the larger particle. The addition of neutralizing agents to polymer dispersions is well known in the art. These neutralizing agents may be used to promote the creation of charge on polymeric particles containing ionizable groups. As an example bases, such as hydroxides (e.g., sodium hydroxide, potassium hydroxide), amines, or ammonia, may be added to a dispersion of polymeric particles containing carboxylic acid groups to de-protonate the acid groups, thus increasing the charge on the particle surface. In such an instance it may be desirable to add PNPs to such a polymer dispersion before any, optionally before all, of the neutralizing agent is added. Likewise, in instances where it is desirable to add other stabilizing agents (e.g. surfactants) to a dispersion of larger polymeric particles, it may desirable to add the PNPs to the dispersion of larger polymeric particles prior to the addition of any, optionally all, of said other stabilizing agents.

As used herein, the following abbreviations shall have the following meanings, unless the context clearly indicates otherwise: C=centigrade; μ=micron; UV=ultraviolet; rpm=revolutions per minute; nm=nanometer; J=joules; cc=cubic centimeter; g=gram; wt %=weight percent; L=liter; mL=milliliter; MIAK=methyl iso-amyl ketone; MIBK=methyl iso-butyl ketone; PMA=poly(methyl acrylate); CyHMA=cyclohexylmethacrylate; EG=ethylene glycol; DPG=dipropylene glycol; DEA=diethylene glycol ethyl ether acetate;

BzA=benzylacrylate; BzMA=benzyl methacrylate; MAPS=MATS=(trimethoxylsilyl)propylmethacrylate; PETTA=pentaerythriol tetra/triacetate;

PPG4000DMA=polypropyleneglycol 4000 dimethacrylate; DPEPA= dipentaerythriol pentaacrylate; TMSMA=trimethylsilyl methacrylate; MOPTSOMS=methacryloxypropylbis(trimethylsiloxy)methylsilane; MOPMDMOS=3-methacryloxypropylmethyldimethoxysilane; TAT=triallyl-1,3,5-triazine-2,4,6-(1H,3H,5H)-trione; IBOMA=isobornyl methacrylate; PGMEA=propyleneglycol monomethylether acetate; PEGMEMA475=poly(ethylene glycol methyl ether)methacrylate Mw=475; EUG=eugenol (4-allyl-2-methoxyphenol); and PGDMA=propyleneglycol dimethacrylate.

The term "(meth)acrylic" includes both acrylic and methacrylic and the term "(meth)acrylate" includes both acrylate and methacrylate. Likewise, the term "(meth)acrylamide" refers to both acrylamide and methacrylamide. "Alkyl" includes straight chain, branched and cyclic alkyl groups.

All ranges defined herein are inclusive and combinable.

The solids content of the coating composition may be from about 10% to about 85% by volume. The viscosity of the aqueous composition may be from 0.05 to 2000 Pa.s (50 cps to 2,000,000 cps), as measured using a Brookfield viscometer; the viscosities appropriate for different end uses and application methods vary considerably.

The coating composition may be applied by conventional application methods such as, for example, brush or paint roller, air-atomized spray, air-assisted spray, airless spray, high volume low pressure spray, air-assisted airless spray, and electrostatic spray.

The coating composition on the substrate is typically dried, or allowed to dry, at a temperature from 20° C. to 95° C.

The following examples are presented to illustrate further various aspects allowed to dry, at a temperature from 20° C. to 95° C.

EXAMPLE 1

Preparation of Silane functional PNP

A monomer mixture of BA/MMA/MATS*/MAA/TMPTMA (450g: 39/31/10/10/10 w/w in 112 g isopropanol) and Triganox® 125-C75 (9 g) was added over 120 minutes to isopropanol (2325 g) at 79 C under nitrogen. The batch was held at 79 C for 30 minutes before addition of Triganox 125-C75 (9 g in 22 g isopropanol). After addition of two further aliquots of Triganox 125-C75 (9 g in 22g isopropanol) were added at 30 minute intervals, the batch was held for 2.5 hours, then allowed to cool to room temperature. The resulting material was determined to have an average particle size of 9.6nm by GPC. To the batch is added a mixture of 42.5 g of an aqueous 50% solution of $NH_4OH$ and 450 g water. The neutralized PNP dispersion is transferred to a roto-evaporator and stripped of solvent at ca. 35° C. under vacuum. After removing substantially all of the solvent, the PNP dispersion is further diluted with water to ca. 25wt. % PNP in water. The particle size is unchanged.

*MATS: Methacryloxytrimethoxypropylsilane

EXAMPLE 2

Preparation of Fluorine Functional PNP

A monomer mixture of BA/MMA/TFEM*/MAA/TMPTMA (450 g: 39/31/10/10/10 w/w in 112 g isopropanol) and Triganox® 125-C75 (9 g) was added over 120 minutes to isopropanol (2325 g) at 79 C under nitrogen. The batch was held at 79 C for 30 minutes before the addition of Triganox 125-C75 (98 g in 22 g isopropanol). After addition of two further aliquots of Triganox 125-C75 (9 g in 22 g isopropanol) were added at 30 minute intervals, the batch was held for 2.5 hours, then allowed to cool to room temperature. The resulting material was determined to have an average particle size of 4nm by GPC. To the batch is added a mixture of 42.5 g of an aqueous 50% solution of $NH_4OH$ and 450 g water. The neutralized PNP dispersion is transferred to a roto-evaporator and stripped of solvent at ca. 35° C. under vacuum. After removing substantially all of the solvent, the PNP dispersion is further diluted with water to ca. 25wt. % PNP in water. The particle size is unchanged.

*TFEM: 2,2,2-Trifluoroethyl Methacrylate

COMPARATIVE EXAMPLE 1

Formulation of Aqueous Exterior Semi-Gloss Architectural Coating

Composition

| Material | Weight (g) |
|---|---|
| Combine the following materials in a Cowles mixer | |
| Propylene Glycol | 32.25 |
| Tamol ® 731 (25%) | 14.21 |
| Foamaster VL | 1.04 |
| Ti-Pure ® R-706 | 208.38 |
| Water | 14.41 |
| Add the following materials with low shear mixing | |
| Rhoplex SG-10M (50%) | 486.95 |
| Texanol ® | 24.29 |
| Foamaster VL | 1.05 |
| Acrysol ® RM-2020 NPR | 25.0 |
| Acrysol ® RM-8W | 5.0 |
| Water | 179.0 |
| Total | 1021.59 |

ACRYSOL®, RHOPLEX®, and TAMOL® are trademarks of Rohm and Haas Company. TEXANOL® is a trademark of Eastman Chemical Co. Foamaster is a tradename of Cognis Corporation. Ti-Pure® is a trademark of EI DuPont de Nemours. Co.

EXAMPLE 3

Formulation of Experimental Aqueous Exterior Semi-Gloss Architectural Coating

Composition Using PNPs Formed in Example 1

| Material | Weight (g) |
|---|---|
| Combine the following materials in a Cowles mixer | |
| Propylene Glycol | 59.91 |
| Tamol ® 731 (25% solids) | 13.67 |
| Foamaster VL | 1.01 |
| Ti-Pure ® R-706 | 200.54 |
| Water | 13.87 |
| Add the following materials with low shear mixing | |
| Rhoplex SG-10M (50% solids) | 486.95 |
| Example 1 (25% solids) | 9.74 |
| Texanol ® | 24.29 |
| Foamaster VL | 1.05 |
| Acrysol ® RM-2020 NPR | 25.0 |
| Acrysol ® RM-8W | 5.0 |
| Water | 174.4 |
| Total | 1015.43 |

ACRYSOL®, RHOPLEX®, and TAMOL® are trademarks of Rohm and Haas Company. TEXANOL® is a trademark of Eastman Chemical Co. Foamaster is a tradename of Cogins Corporation. Ti-Pure® is a trademark of EI DuPont de Nemours. Co.

EXAMPLE 4

Formulations of Experimental Aqueous Exterior Semi-Gloss Architectural Coating

Composition Using PNPs Formed in Example 2

Example 4 is prepared according to Example 3 with the exception that PNPs from Example 1 are replaced with PNPs from Example 2.

Coating Evaluation

Test Methods for Aqueous Exterior Semi-Gloss Architectural Coatings

Gloss: A coating composition is drawn down on a Leneta chart (The Leneta Company, Mahwah, N.J.) with a 3-mil Bird film applicator. The sample is dried at 21° C. and 50% relative humidity for seven days. 60° gloss is measured with a Micro-TRI-gloss gloss meter (Byk Garner, Columbia, MD.).

Dirt Resistance: A coating composition is drawn down on an aluminum panel with a 5-mil Bird film applicator. The sample is dried at 21° C. and 50% relative humidity for seven days. The panel is exposed at a 45° angle facing South for 6 months. The panel is inspected every three months and dirt pickup is rated on a scale of 1–10. A rating=1 represents black color throughout the coating; a rating=10 represents white color throughout the coating.

| Sample | Gloss | Dirt Pickup Resistance Rating |
|---|---|---|
| Aqueous Coating Composition Formed in Comparative Example 1 | 75 | 6 |
| Aqueous Coating Composition Formed in Example 3 | 75 | 10 |
| Aqueous Coating Composition Formed in Example 4 | 75 | 10 |

Dry films of coating of Experimental Coatings 3 and 4, containing polymeric nanoparticles, have superior dirt pickup resistance relative to Comparative Coating 1, which does not contain polymeric nanoparticles.

Aqueous Elastomeric Roof Coating

Formulation of Agueous Elastomeric Roof Coating Compositions

COMPARATIVE EXAMPLE 2

Formulation of Aqueous Elastomeric Roof Coating Composition

| Material | Weight (g) Comparative Coating #1 |
|---|---|
| Combine the following materials in a high shear Cowles mixer | |
| Water | 152.2 |
| Tamol ® 850 (dispersant) | 4.0 |
| KTPP (dispersant) | 1.2 |
| Nopco NXZ (defoamer) | 1.9 |
| Omyacarb 12 (extender) | 353.2 |
| Ti-Pure ® R-960 (pigment) | 58.9 |
| Kadox 915 (pigment) | 39.2 |
| Add the following materials with low shear mixing | |
| Water | 105.1 |
| Rozone ® | 6.0 |
| Rhoplex ® EC-1791 (55% solids) | 393.7 |
| Nopco NXZ (defoamer) | 1.9 |
| Texanol ® (coalescent) | 5.9 |
| Ammonia | 1.0 |
| Ethylene glycol | 24.4 |
| Natrosol 250 MR (thickener) | 4.2 |
| Total | 1152.8 |

Rhoplex®, Tamol®, and Rozone® are trademarks of Rohm and Haas Company. Texanol® is a trademark of Eastman Chemical Company. Ti-Pure® is a trademark of EI Dupont de Nemours Company. Nopco is a tradename of Cogins Corporation. Kadox is a tradename of Zinc Corporation of America. Omyacarb is a tradename of Omya, Inc. Natrosol is a tradename of Hercules, Inc.

EXAMPLE 5

Formulation of Experimental Aqueous Elastomeric Roof Coating

Composition Using PNPs Formed in Example 1

| Material | Weight (g) Experimental Coating #2 |
|---|---|
| Combine the following materials in a high shear Cowles mixer | |
| Water | 152.2 |
| Tamol ® 850 (dispersant) | 4.0 |
| KTPP (dispersant) | 1.2 |
| Nopco NXZ (defoamer) | 1.9 |
| Omyacarb 12 (extender) | 348.0 |
| Ti-Pure ® R-960 (pigment) | 58.9 |
| Kadox 915 (pigment) | 39.2 |
| Add the following materials with low shear mixing | |
| Water | 97.4 |
| Rozone ® | 6.0 |
| Rhoplex ® EC-1791 (55% solids) | 393.7 |
| Example 1 (25% solids) | 9.8 |
| Nopco NXZ (defoamer) | 1.9 |
| Texanol ® (coalescent) | 5.9 |
| Ammonia | 1.0 |
| Ethylene glycol | 24.4 |
| Natrosol 250 MR (thickener) | 4.2 |
| Total | 1149.7 |

EXAMPLE 6

Formulation of Experimental Aqueous Elastoemric Roof CoatingComposition

Using PNPs Formed in Example 2

Example 6 is prepared according to Example 5 with the exception that PNPs from Example 1 are replaced with PNPs from Example 2.

Coating Evaluation

Test Method for Elastomeric Coatings p0 Dirt Resistance: A coating composition is drawn down on an appropriate substrate (aluminum panel, fiber cement panel, hot stucco panel) to a wet film thickness of 40 mils. The sample is dried at 21° C. and 50% relative humidity for 21 days. The panel is exposed at a 45° angle facing South for 6 months. The panel is inspected every three months and dirt pickup is rated on a scale of 1 to 10. A rating=1 represents black color on the surface; a rating=10 represents white color on the surface.

| Sample | Dirt Pickup Resistance Rating |
|---|---|
| Aqueous Coating Composition Formed in Comparative Example 2 | 6 |
| Aqueous Coating Composition Formed in Example 5 | 10 |
| Aqueous Coating Composition Formed in Example 6 | 10 |

Dry films of coating of Experimental Coatings 5 and 6, containing polymeric nanoparticles, have superior dirt pickup resistance relative to Comparative Coating 2, which does not contain polymeric nanoparticles.

EXAMPLE 7

Preparation of a PNP Suitable for Resin Supported Emulsion Polymerization

PNPs of methyl methacrylate/butyl acrylate/2,2,2-trifluoroethyl methacrylate/acrylic acid/trimethylol propane triacrylate (25/35/10/20/10 wt. %) are prepared via solution polymerization as follows: A 5 liter reactor is fitted with a thermocouple, a temperature controller, a purge gas inlet, a water-cooled reflux condenser with purge gas outlet, a stirrer, and a monomer feed line. To a separate vessel is charged 450.0 g of a monomer mixture (A) consisting of 112.5 g methyl methacrylate (MMA), 157.5 g butyl acrylate (BA), 45.0 g 2,2,2-trifluoroethyl methacrylate, 90.0 g acrylic acid (AA), and 45.00 g trimethylol propane triacrylate (TMPTA). To an additional vessel is charged an initiator mix (B) consisting of 18.00 g of a 75% solution of t-amyl peroxypivalate in mineral spirits (Triganox 125-C75), and 112.50 g isopropyl alcohol. A charge of 2325.00 g isopropyl alcohol is added to the reactor. After sweeping the reactor with nitrogen for approximately 30 minutes, heat is applied to bring the reactor charge to 79° C. When the contents of the reactor reach 79° C., a dual feed of both the monomer mixture (A) and the initiator mix (B) are added to the reactor. The two mixtures are fed uniformly using feed pumps over 120 minutes. At the end of the monomer and initiator feeds, the batch is held at 79° C. for 30 minutes before adding the first of three additional initiator charges consisting of 9.00 g of a 75% solution of t-amyl perxypivalate in mineral spirits (Triganox 125-C75), and 22.50 g isopropyl alcohol. A second initiator charge addition is made 30 minutes after the first initiator charge addition. Similarly, the final initiator charge addition is made 30 minutes after the second initiator charge addition. The batch is then held at the polymerization temperature of 79° C. for and additional 2½ hours to achieve full conversion of monomer. At the end of the final hold, the batch is neutralized with a mixture of 42.5 gm of an aqueous 28% solution of aqueous ammonia and 450.00 g water. The neutralized polymer solution is transferred to a roto-evaporator and stripped of solvent at ~35° C. at reduced pressure. After removing all solvent the batch is further diluted with water to ~25% polymer (PNP) in water. Particle size is measured at ~5.0 nm. The resulting aqueous PNP dispersion can be used as a stabilizer for emulsion polymerizations.

EXAMPLE 8

Resin Supported Emulsion Polymerization Utilizing a PNP 342 g (25% active in water) of ammonia neutralized PNPs formed in Example 7, pH 8–9 adjusted with aqueous ammonia are added to a 2-liter, 4 neck round bottom flask equipped with a side arm, condenser, stirrer, and thermocouple. The flask contents are heated to 85° C. under a nitrogen sweep. The monomers, 175.0 g of butyl acrylate and 175.0 g of methyl methacrylate, are added over a 1.5 hour period, while simultaneously adding a separate solution of 2.63 g ammonium persulphate in 100.0 g DI water and 0.22 g of 28% ammonium hydroxide, over a 2 hour time period. After the monomer mix feed is complete the persulphate cofeed continues for another 30 minutes. At this point, the contents of the flask are held at 85° C. for an additional 60 minutes. Afterwards, the contents of the flask are cooled to 25° C. and filtered through a 100/325 mesh set of stacked screens, yielding a negligible quantity of coagulated polymer. A quantity of DI water sufficient to dilute the emulsion to a final solids of 50% is added. The emulsion has a pH of 7.5 and a particle size of 128 nm.

A coating formulated according to Comparative Example 1 in which the emulsion polymer of Example 8 replaces Rhoplex SG-10M demonstrates superior dirt pick-up resistance as compared to the coating formulated in Comparative Example 1.

We claim:

1. An aqueous coating composition for improving the dirt pick up resistance characteristics of a coating comprising polymeric nanoparticles having a mean particle diameter of from 1 to 10 nm and functionalized with photosensitive moieties and at least one of fluorinated and silicon moieties, the polymeric nanoparticles obtained from monomers comprising from 1 to 99.5%, by weight, of at least one multi-ethylenically unsaturated monomer and at least one ethylenically unsaturated water soluble monomer.

2. The composition of claim 1 wherein the photosensitive moieties are obtained from photosensitive monomers selected from the group consisting of vinyl benzophenone, acryloxybenzophenone, photoinitiator monomers having ethylenically unsaturated groups copolymerizable with the at least one multi-ethylenically unsaturated monomer, monoethylenically unsaturated derivatives of substituted benzophenones or acetophenones, allyl benzoylbenzoates, and benzophenones of structures I and II:

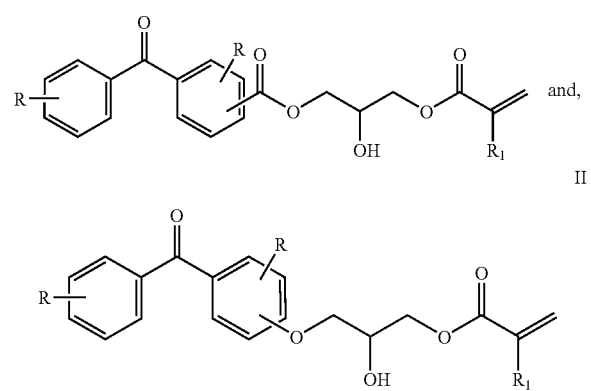

wherein R is a radical selected from the group consisting of the hydrogen, alkyl or aryl radicals and R1 is a radical selected from the group consisting of the hydrogen and methyl radicals.

3. The composition of claim 2 wherein the benzophenones of structures I and II are selected from the group consisting of include (2-hydroxy-3-methacryloxy)propyl Ortho-benzoyl-benzoate; (2-hydroxy-3-acryloxy)propoxy para-benzoylbenzene and (2-hydroxy-3-acryloxy)propoxy Ortho-methyl-para-benzolybenzene.

4. The composition of claim 2 wherein the allyl benzoylbenzoates are selected from the group consisting of vinylbenzenyl methylbenzolybenzoate, hydroxymethacryloxypropyl methylbenzoate and hydroxymethacryloxypropoxy benzophenone.

5. The composition of claim 1 wherein the polymeric nanoparticles further comprise pendant or residual ultraviolet or oxidatively curable functionalities.

6. The composition of claim 5 wherein the pendent or residual ultraviolet or oxidatively curable functionalities are obtained from compounds that react with the at least one multi-ethylenically unsaturated monomer of the polymeric nanoparticles, the compounds containing at least two sites of unsaturation and the sites of unsaturation are of unequal reactivity.

7. The composition of claim 6 wherein the compounds of unequal reactivity are selected from the group consisting of allyl-, methallyl-, vinyl-, crotyl-esters of acrylic, methacrylic, maleic, fumaric or itaconic acids; allyl-, methallyl- or crotyl-vinyl ethers; thioether; N— or N,N-diallyl-, crotyl-, O-alkyl-, aryl-, P-vinyl-, P-allyl-, P-crotyl- or P-methallyl-phosphonates; and, cycloalkenyl esters of acrylic, methacrylic maleic (mono and diesters), fumaric (mono and diesters) or itaconic (mono and diesters) acids.

8. The composition of claim 5 wherein the polymeric nanoparticles having ultraviolet curable functionalities are obtained from monomers derived from either non-drying or semi-dying oils.

9. The composition of claim 8 wherein the non-drying oils are selected from the group consisting of cottonseed oil, coconut oil, rapeseed oil, caster oil and lesquerella oil.

10. The composition of claim 8 wherein the semi-drying oils are selected from the group consisting of safflower oil, sunflower oil, soybean oil and tobaccoseed oil.

11. The composition of claim 1 wherein the monomers further comprise acetoacetate-containing monomers.

12. The composition of claim 11 wherein the acetoacetate-containing monomer is acetoacetoxyethyl methacrylate.

13. The composition of claim 1 further comprising functionalizing the polymeric nanoparticles with hydrophilic moieties.

14. The composition of claim 1 further comprising at least one binder wherein the Tg of the polymeric nanoparticles is at least 5° C. higher than the Tg of the at least one binder.

15. A coating composition according to claim 1 further comprising polymer particles having a mean particle diameter greater than 50 nm, said polymer particles having been formed in the presence of the polymeric nanoparticles of claim 1.

16. A coating formulation comprising the composition of claim 1, wherein the composition is a sole binder in the coating formulation.

17. A coating formulation comprising the composition of claim 1, wherein the composition is an additive in the coating formulation.

18. A coating formulation comprising the composition of claim 1, wherein the composition is a stabilizer in the coating formulation.

19. A method to improve the dirt pick up resistance characteristics of a coating comprising incorporating the composition of claim 1 into the coating.

* * * * *